United States Patent
Zlotnick et al.

(10) Patent No.: US 11,204,794 B2
(45) Date of Patent: Dec. 21, 2021

(54) AUTOMATED DISASTER RECOVERY OF DISCRETE VIRTUAL MACHINES

(71) Applicant: EMC IP Holding Company LLC, Hopkinton, MA (US)

(72) Inventors: David Zlotnick, Tel Aviv (IL); Assaf Natanzon, Tel Aviv (IL); Boris Shpilyuck, Ashdod (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 42 days.

(21) Appl. No.: 16/389,739

(22) Filed: Apr. 19, 2019

(65) Prior Publication Data

US 2020/0334061 A1 Oct. 22, 2020

(51) Int. Cl.
*G06F 9/455* (2018.01)
*G06F 9/48* (2006.01)
*G06F 11/14* (2006.01)

(52) U.S. Cl.
CPC ........ *G06F 9/45558* (2013.01); *G06F 9/4856* (2013.01); *G06F 11/1464* (2013.01); *G06F 2009/4557* (2013.01); *G06F 2009/45575* (2013.01); *G06F 2009/45591* (2013.01); *G06F 2009/45595* (2013.01); *G06F 2201/815* (2013.01)

(58) Field of Classification Search
None
See application file for complete search history.

(56) References Cited

U.S. PATENT DOCUMENTS

| | | | | |
|---|---|---|---|---|
| 8,572,605 | B1 * | 10/2013 | Tene | G06F 9/5077 718/1 |
| 9,565,202 | B1 * | 2/2017 | Kindlund | G06F 21/567 |
| 2010/0318608 | A1 * | 12/2010 | Huang | G06F 9/4856 709/205 |
| 2015/0341221 | A1 * | 11/2015 | Vatnikov | G06F 11/2097 718/1 |
| 2016/0323145 | A1 * | 11/2016 | Anderson | H04L 67/1031 |
| 2016/0357642 | A1 * | 12/2016 | Burshan | G06F 11/1461 |
| 2017/0060628 | A1 * | 3/2017 | Tarasuk-Levin | G06F 9/45558 |
| 2017/0242784 | A1 * | 8/2017 | Heorhiadi | G06F 11/3692 |
| 2018/0139239 | A1 * | 5/2018 | Sabin | G06F 21/554 |
| 2018/0165185 | A1 * | 6/2018 | Boshev | G06F 11/0793 |
| 2018/0375897 | A1 * | 12/2018 | Kawasaki | H04L 63/1491 |
| 2019/0129738 | A1 * | 5/2019 | Ekbote | G06F 9/45558 |
| 2019/0138342 | A1 * | 5/2019 | Dornemann | G06F 11/2038 |
| 2019/0188027 | A1 * | 6/2019 | Ramachandran | G06F 11/1417 |
| 2019/0243737 | A1 * | 8/2019 | Savino | G06F 11/26 |
| 2019/0253453 | A1 * | 8/2019 | Vissamsetty | H04L 63/20 |
| 2020/0192594 | A1 * | 6/2020 | Balachandran | G06F 3/0664 |

* cited by examiner

*Primary Examiner* — Abu Zar Ghaffari
(74) *Attorney, Agent, or Firm* — Workman Nydegger

(57) ABSTRACT

Virtual machines can be discretely tested for disaster recovery or other data protection operations. To perform these types of data protection operations, a single virtual machine or a set of virtual machines is migrated to a target site and the migrated virtual machines are replaced with dummy virtual machines at the source site. The dummy virtual machines replicate communications. This allows the migrated virtual machines to be tested in the context of disaster recovery to a target site such as the cloud.

18 Claims, 6 Drawing Sheets

AUTOMATED DISASTER RECOVERY OF DISCRETE VIRTUAL MACHINES

FIELD OF THE INVENTION

Embodiments of the invention relate to systems, methods, and apparatus for protecting data. More particularly, embodiments of the invention relate to systems, methods, and apparatus for performing data protection operations including failover operations, automated disaster recovery operations and disaster recovery testing operations.

BACKGROUND

Data protection operations, including disaster recovery is often referred to as a process for protecting an entity from a negative event. Disaster recovery allows an entity to resume their core functions. In one example, disaster recovery often involves recovery to a separate physical location. An on-premise system, for example, may be recovered to the cloud during disaster recovery. While it is possible to recover to the cloud, disaster recovery to the cloud is complex and error prone.

Moving multiple virtual machines between heterogeneous sites for disaster recovery, such as from an on-premise site to a cloud site (e.g., from VMware vSphere to AWS or Azure cloud) is not straightforward. When recovering to the cloud, the virtual machines need to be converted in order to run in a different environment. More specifically, the metadata of the virtual machine or the configuration of the virtual machine (e.g., the VM data itself, e.g. device drivers, VM configuration, central processing units, memory, network configuration), need to be converted in order to run on a different hypervisor and in a different environment.

Even though several conversion utilities and tools are available to aid in the conversion process, the results are not guaranteed. As a result, manual reconfiguration steps and extensive testing are conventionally performed before performing an actual disaster recovery test. In fact, relying strictly on conversion utilities for disaster recovery is likely to lead to serious failure.

To prepare for a potential disaster, an entity should perform disaster recovery testing. However, even disaster recovery testing is costly in terms of cloud resources and expense, particularly when a large number of virtual machines is involved.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1A:
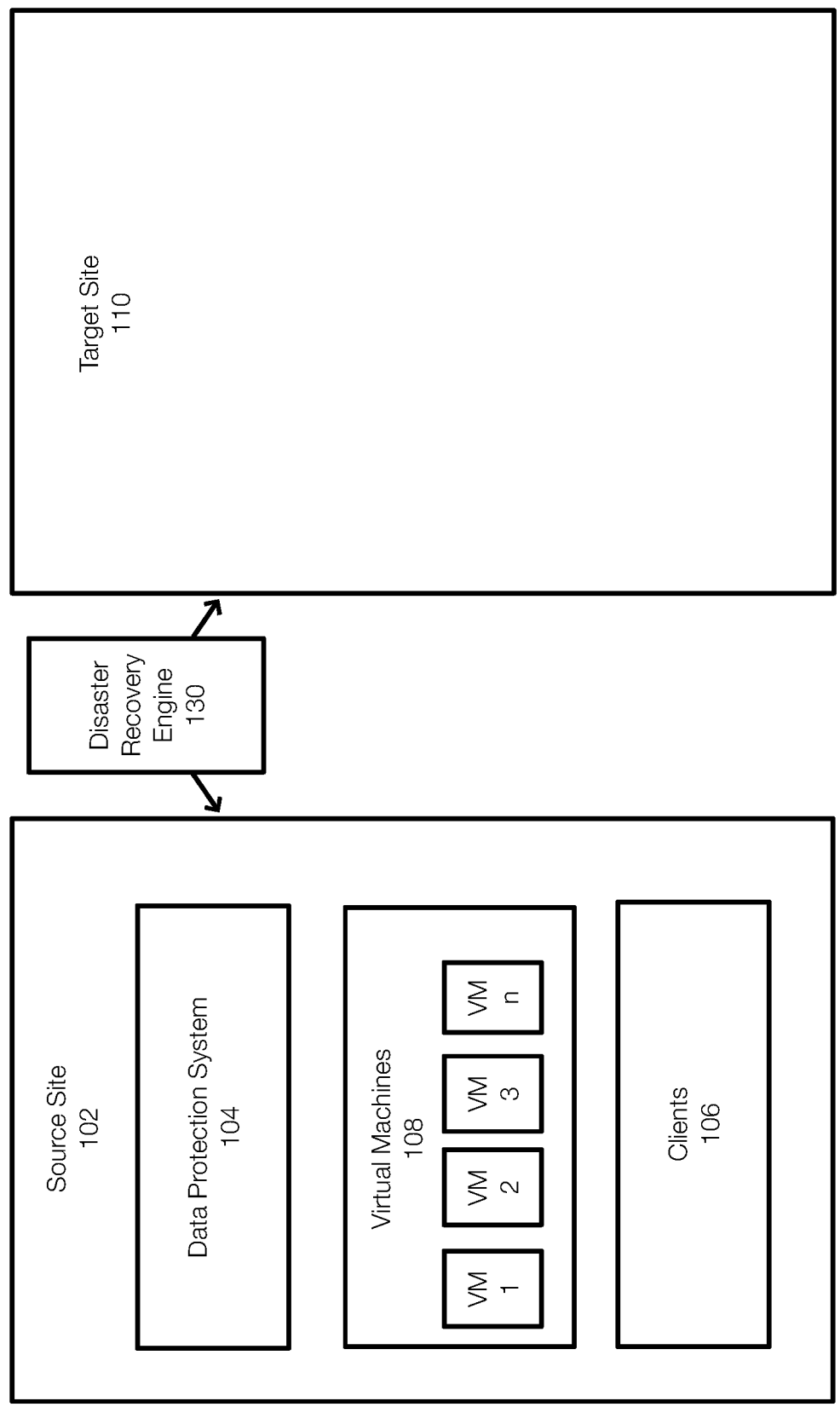
FIG. 1A, FIG. 1B, FIG. 1C, and FIG. 1D illustrate an example or examples of a computing system in which a disaster recovery plan may be tested or in which failover may be performed and illustrate the migration and testing of one or more virtual machines.

Embodiments of the present invention generally relate to data protection and to systems, methods, and apparatus for performing data protection operations. Examples of data protection operations include, but are not limited to, backup operations, restore operations, replication operations, disaster recovery operations, disaster recovery testing operations, failover or partial failover operations, data synchronization operations, replication operations or the like or combination thereof. More particularly, embodiments of the invention relate to systems, hardware, software, computer-readable media, and methods for performing data protection operations.

Data protection operations such as disaster recovery testing are usually considered critical processes. If a disaster recovery plan is never tested, the ability of a business to operate or to have business continuity is extremely difficulty when there is a problem with the primary computing system at least because the disaster recovery operation is rife with potential problems. As previously described, this is difficult because of the cost and computing resources conventionally required to perform disaster recovery testing.

Embodiments of the invention are discussed with respect to disaster recovery testing operations. However, embodiments of the invention may also apply at least to disaster recovery operations and failover or partial failover operations.

Disaster recovery testing in virtualized environments may be accomplished by performing disaster recovery testing in the context of a source site to a target site (e.g., an on-premise site to the cloud). Stated differently, disaster recovery testing may be performed from a local or customer's data center to a hosted site or datacenter. As previously stated, there is no guarantee that the virtual machines on the source site will be able to power up and run smoothly on the target site. This is because, in part, the target site may have different hypervisors, different networking infrastructure, different storage arrangements, or the like.

As a result, testing of the virtual machines on the target site is conventionally required and reconfiguration of the virtual machines themselves or their settings may be needed to accommodate the environment of the target site. As a result, manual reconfiguration actions may be required in addition to any actions performed by automated conversion tools.

Disaster recovery testing operations are also faced with the fact that applications may be composed of or use a large number of virtual machines. Conventionally, all of the application's virtual machines need to be moved to the target site, for the purpose of disaster recovery testing, or in case of an actual disaster. Migrating an entire application that contains multiple virtual machines to the cloud or to another target site can be very complex and may be very costly at least in terms of resource consumption. Embodiments of the invention are able to overcome these daunting circumstances and perform disaster recovery testing operations, disaster recovery, or failover operations in an improved manner. Embodiments of the invention allow for virtual machines to be tested in smaller groups. The gradual migration and testing of individual virtual machines or set of virtual machines in an application can reduce the overall risk associated with disaster recovery testing.

Thus, embodiments of the invention automate the disaster recovery testing process or the testing of specific virtual machines or of a specific virtual machine. The process often starts by migrating at least one virtual machine to the target site for testing purposes. As previously stated, a properly tested virtual machine can also be failed over to a target site such as the cloud from a source site if necessary during normal operations.

The migrated virtual machines are connected to the virtual machines that remain at the source site. Once connected, the migrated virtual machine or set of virtual machines can be tested. The tests may be configured to ensure that the migrated virtual machines operate with the virtual machines that are not migrated or ensure, in a case where all virtual machines (of an application or of multiple applications) of an application or associated with a client or entity can operate on the target site.

Embodiments of the invention enable entities to progressively and seamlessly achieve disaster recovery readiness of an entire multiple virtual machine application. Embodiments of the invention can reduce disaster recovery costs, reduce the failure risks of a disaster recovery plan and achieve a successful implementation of a disaster recovery solution.

Once tested, embodiments of the invention enable an automated system for performing disaster recovery operations, failover operations, and/or partial failover operations (or other data protection operations) for individual virtual machines or groups of virtual machines.

The following discussion introduces elements of embodiments of the invention. The testing process is achieved by migrating selected virtual machines and connecting the migrated virtual machines to the virtual machines at the source site. The selection of virtual machines to test can be automated, random, manual, or the like. This allows the migrated virtual machines to be properly configured for the characteristics of the target site such that proper operation is ensured, at the target site, in the event of an actual disaster or in the event of failover or partial failover.

Initially, the process of performing disaster recovery testing operations (or failover operations, or other data protection operations) begins by backing up a virtual machine or a set of selected virtual machines and then migrating the virtual machine or the set of selected virtual machines from a source site to a subnet that is created at a target site. The migration can be achieved using data sets produced by backup or by performing replication operations or by taking a snapshot, or other manner.

For example, a backup or replication operation may take a snapshot of a virtual machine and its configuration. The resulting data or data set can be transferred to the target site and conversion tools can be used to at least partially complete the migration of the virtual machine or the virtual machines. The conversion tools may make the migrated virtual machines compatible with the target site. A user can review the virtual machines and the configurations of the converted and migrated virtual machines. Reviewing a small number of virtual machines can be done quickly. If necessary, the virtual machines can be manually reconfigured or adjusted. Manually configuring a small number of virtual machines, however, is much simpler than a user that is forced to manually configured a large number of virtual machines. Any manual adjustments can be learned by the system and applied to subsequent transfers.

The migrated virtual machines, once properly configured, can be powered up or booted in an isolated network or subnet at the target site. The isolated network may be provisioned by the data protection system or by a user of the source site or by the target site. The data protection system may use application programming interfaces (APIs) of the target site to provision a dedicated subnet for the migrated virtual machines. Initially, the new subnet is isolated and has no web access or routing to other cloud networks.

In this state, the migrated virtual machines cannot be fully tested at least because the remaining application components and interfaces are not present in the target site and the migrated virtual machine has no connection to the source site. Thus, part of the disaster recovery testing operations is to connect the migrated virtual machines to the source site.

To continue the process, connecting the target site with the source site may begin by replacing the original virtual machines (the virtual machines that have been migrated to the target site) with dummy virtual machines at the source site. On the source site, the data protection system (or other component) may shut down the original instances of the virtual machines that were migrated to the target site and replace the original instances with dummy virtual machines. Dummy virtual machines are examples of dedicated virtual machines that have the same network interfaces as the virtual machines they are replacing. Thus, these dummy virtual machines are connected to the same subnets with the same IP addresses as the original virtual machines at the source site. The dummy virtual machines will be used as port replicators. This may be necessary because the IP addressing on the target site is often different from the IP addressing on the source site. As a result of the migration and because of the different network environment, the IP addresses of the migrated virtual machines cannot be retained, and the migrated virtual machines receive different IP addresses than the IP addresses they had at the source site.

After the port replicators or dummy virtual machines are in place at the source site, a connection between the source site and the target site is established. The connection may include a virtual private network (VPN) connection. VPNs provide the ability to create a secure network connection across a public network through the use of encryption. As a result, VPNs provide privacy and a certain level of trust.

VPN types include network-to-network, multiple service host-server, to single-service host-server. A commonly used VPN technology is the network-to-network VPN. While this architecture would not likely be used in the client-to-cloud connection, it can be used within the cloud, especially with server farms or mashups.

In one example, the data protection system may use a VPN tunnel to connect the virtual machines on the source site to the target site or cloud environment. For many applications, an IP-based layer-3 VPN such as MPLS VPN, SSL VPN or IPsec VPN can be used for the inter-virtual machine communication within the application. In some specific cases, a layer-2 VPN can also be used. Public cloud providers such as AWS offer a cloud-hosted VPN Gateway. The VPN Gateway can be provisioned to create a VPN from the customer or source site to the cloud or target site. However, a VPN GW may be required on the source site as well. This arrangement may require the customer (the source site) to provide the details of the on-premise VPN gateway. The VPN GW on the cloud or target site can be auto-provisioned and the interconnecting VPN tunnel can be configured.

Next, the migrated virtual machines at the target site are connected to the source site. The data protection system can use the VPN tunnel connecting the source site to the target site to connect the subnet that was created in the target site for the migrated virtual machines to the source site, which includes the remaining virtual machines or application virtual machines.

The dummy-virtual machines on the source site can be configured to act as NAT proxies and will transparently forward all incoming and outgoing network traffic to/from the virtual machines that were moved or migrated to the target site.

This arrangement allows an end-to-end disaster recovery test to be performed with respect to the migrated virtual machines. This also allows a partial failover to be performed for selected virtual machines. These data protection operations can be performed without any reconfiguration or changes on the remaining environment or virtual machines at the source site.

After the disaster recovery test of the selected virtual machines is successfully performed or after the partial failover situation is resolved, the data protection system allows the computing system to revert or return to normal operation by effectively reversing the steps performed in setting up and conducting the disaster recovery test or partial failover. These steps can be performed in different orders.

Figure 1B:
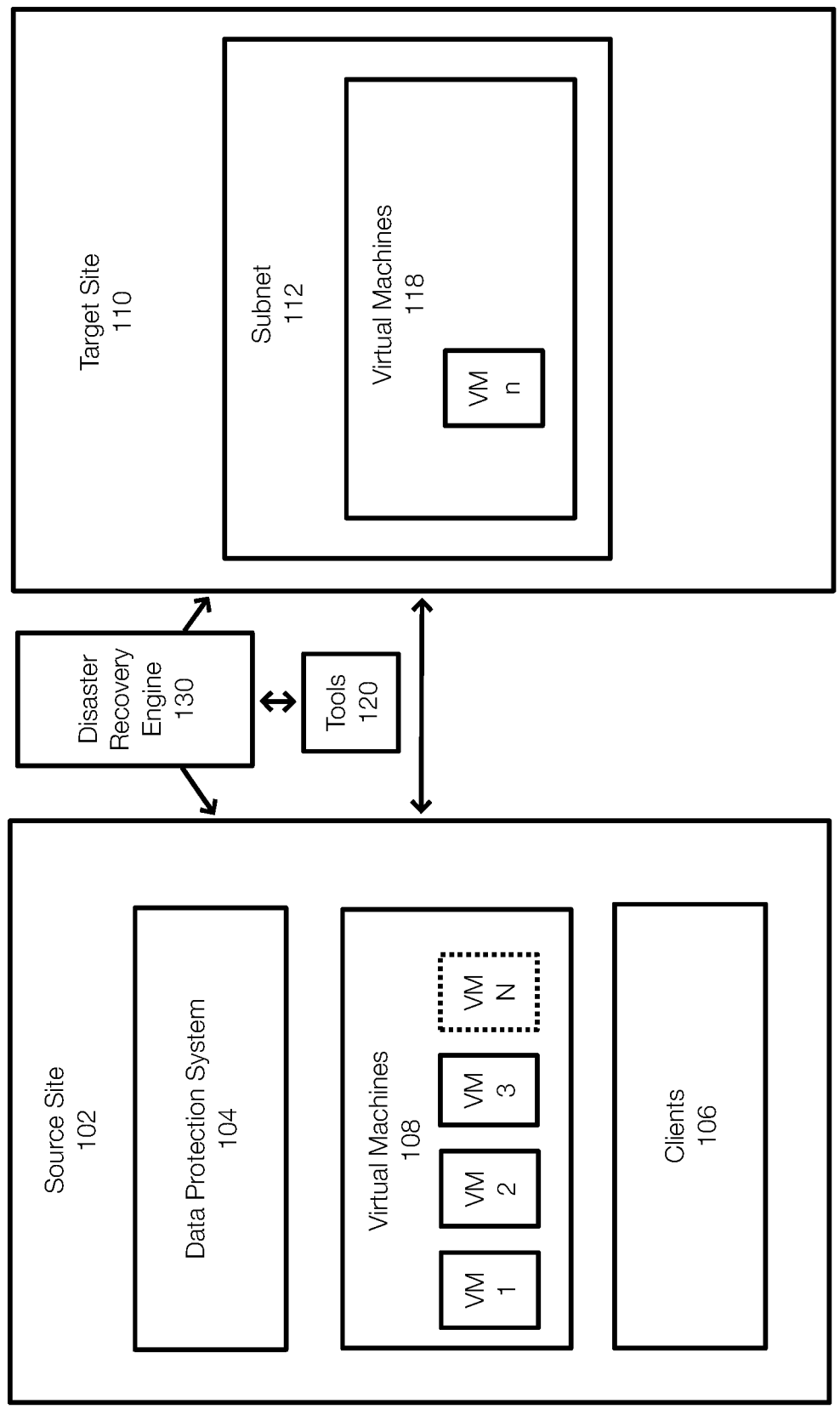
Figure 1C:
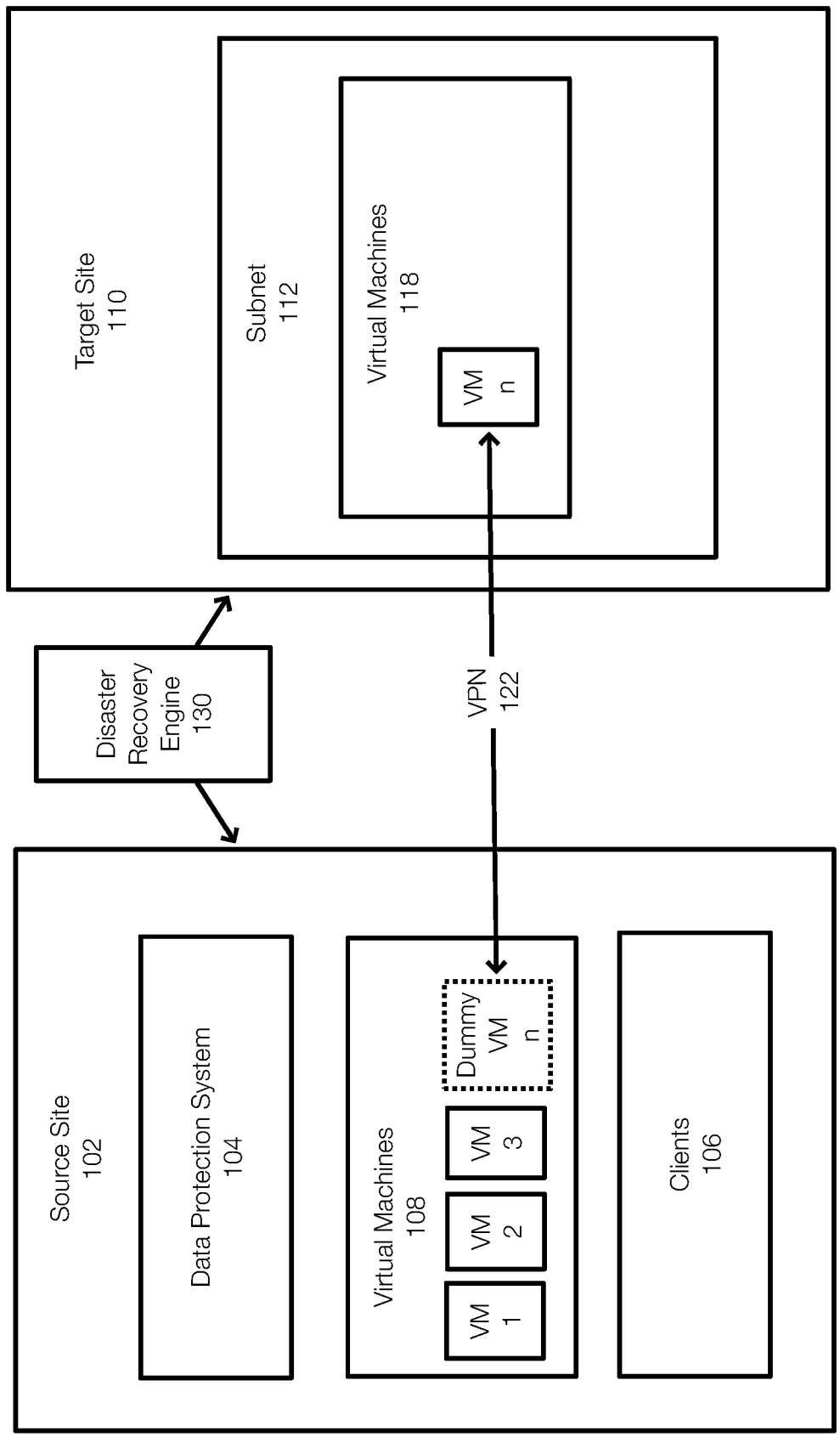

FIGS. 1A-1C illustrate an example of systems and methods for performing data protection operations such as disaster recovery testing operations, failover or partial failover operations, testing recovery operations, disaster recovery operations, or the like or combination thereof. FIG. 1A illustrates a computing system when beginning a data protection operation. FIG. 1B illustrates the computing system during migration of the virtual machines to a target site. FIG. 1C illustrates an example of the computing system when the computing system is prepared to perform disaster recovery testing.

FIG. 1A illustrates a computing system that includes a source site 102 (e.g., an entity's on premise or local data center) that is associated with a target site 110 (e.g., a cloud-based data center). The source site 102 is associated with a data protection system 104 that may include a disaster recovery engine 130. The source site 102 may also provide an environment (e.g., hardware, software, hypervisor, APIs) for running virtual machines 108. The source site may include computing resources such as memory, processors, and other circuitry from which virtual machines are provisioned. Similarly, the target site may also provide computing resources from which virtual machines can be provisioned and from which networks can be created.

The number of virtual machines at the source site 102, represented as VM 1-VM n, may be large and may be associated with one or more applications. The source site 102 may also include clients 106. The clients 106 may interact with the virtual machines 108. The data protection system 104 may perform data protection operations for the source site 102. In this example, the disaster recovery engine 130, which is a part of the data protection system 104, may perform aspects of embodiments of the invention including disaster recovery testing, disaster recovery, failover, or the like.

In this example, all of the applications associated with the source site 102 are running on the source site 102. However, embodiments of the invention allow for some applications to be already present and running on other sites. For example, the source site 102 may implement and run certain applications while other applications may be cloud-based applications and may run outside of the source site 102.

In the context of disaster recovery and disaster recovery testing for the virtual machines 108, it is assumed that the virtual machines 108 are all running on the source site 102 in FIG. 1A. The disaster recovery engine 130 may initiate a process for performing disaster recovery testing. This may include selection one or more of the virtual machines 108 for migration to the target site 110. Over time, all of the virtual machines 108 may be tested. This allows any or all virtual machines to be recovered to the cloud during a disaster if necessary, in an automated fashion.

As previously stated, some of the virtual machines 108 may be part of or associated with the same application. The virtual machines 108 may include virtual machines associated with multiple applications. In this example, the virtual machines VM 1-VM n are part of or associated with the same application. The disaster recovery engine 130 (or a user through a user interface) may select one or more of the virtual machines 108 for disaster recovery testing purposes. In this example, the VM n is selected. However, more than one virtual machine may be selected. Further, it is not necessary to select all of the virtual machines associated with the same application. Any number of virtual machines can be selected.

The disaster recovery engine 130 may initiate a backup operation or replication operation as part of the disaster recovery testing operation. Assuming, for example, that VM n is selected for testing purposes, a backup (such as a snapshot) may be taken of the VM n. Alternatively, the VM n can be replicated or a previous backup can be used.

After the backup is ready, the disaster recovery engine 130 is tasked with migrating the VM n to the target site 110. This may require the snapshot or backup to be transmitted over a network (e.g., the Internet) from the source site 102 to the target site 110. The disaster recovery engine 130 may migrate the VM n.

FIG. 1B illustrates that the VM n has been migrated to the target site 110 in which a subnet 112 has been created or formed. In particular, the VM n is stored along with any other virtual machines 118 that have been migrated. The VM n is instantiated or booted in a subnet 112. The subnet 112 initially does not have any web access or connections to other subnets that may be present in the target site 110. At this stage, the VM n is effectively isolated at the target site 110.

The disaster recovery engine 130 may use tools 120 during the migration of the VM n in order to perform conversions or adjustments to the data or configuration of the VM n. These conversions or adjustments are typically necessary in order to ensure that the VM n can function with a new or different hypervisor, operate with different network infrastructure and storage, or the like. The tools 120 may be provided by the target site 110 and may be accessed by an API. This process can also be remembered, for example, using machine learning, to facilitate the testing of subsequent virtual machines.

Next, the VM n may be booted or initiated at the target site and any further configuration changes or adjustments can be made to ensure that the VM n operates as expected in the computing environment of the target site 110.

FIG. 1C illustrates the process of connecting the VM n at the target site 110 to the virtual machines 108 at the source site 102. In this example, once the VM n at the target site 110 is properly configured and/or booted, a dummy VM n may be created at the source site 102. The dummy VM n may act as a replicator to allow communications between the virtual machines 108 and the virtual machines 118 or, more specifically, between the dummy VM n and the migrated VM n.

With the dummy VM n in place, a VPN 122 may be established that allows the source site 102 to communicate with the target sit 110 or more specifically with the subnet 112. More specifically, the VPN 122 allows the dummy VM n at the source site 102 to communicate with the VM n running on the target site 110. In effect, the dummy VM n acts forwards communications from the virtual machines 108 to the virtual machines 118 and forwards communications from the virtual machines 118 to the virtual machines 108. The dummy VM n at the source site 102 may also forward communications with other computing devices such as clients, servers, or the like that may interact with the VM n.

From the perspective of the virtual machines VM 1, VM 2, and VM 3 at the source site (or other applications, clients, servers), the VM n is present at the source site 102. The arrangement shown in FIG. 1C allows the VM n to be tested for disaster recovery purposes, failover purposes, or for other reasons. In another example, FIGS. 1A-1C also illustrate that this process can be used to failover one or more virtual machines to a target site 110, such as the cloud. In one example, the disaster recovery testing also ensures that previously tested virtual machines can be failed over if necessary, in an automated manner.

Once the VM n is migrated to the target site 110, running and connected to the dummy VM n, various tests can be run to ensure that the VM n and/or the other VMs of the application at the source site 102 and/or at the target site 110 operate as expected. In addition, it may be possible to perform certain data protection operations in this state.

Figure 1D:
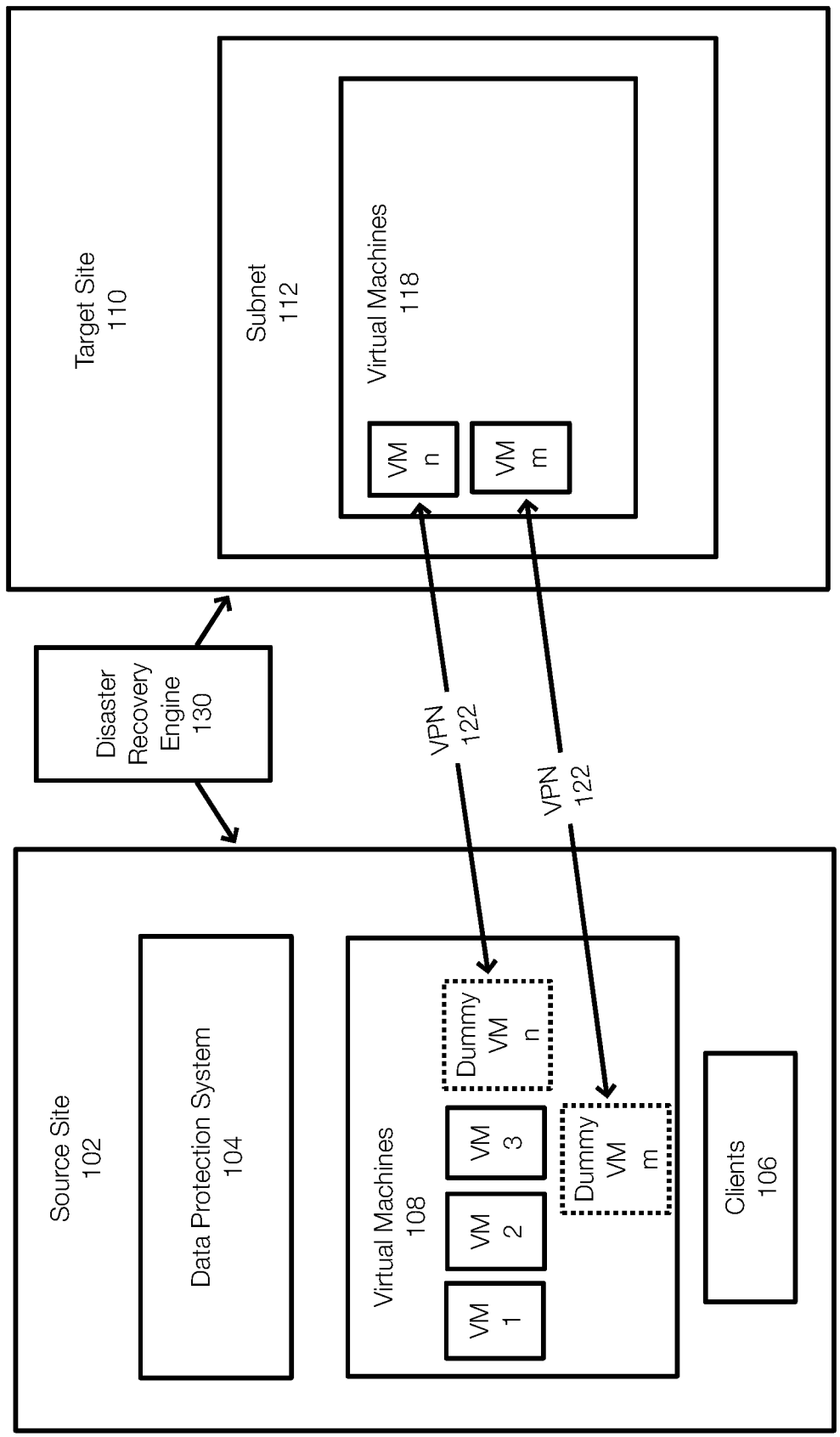

In one example, more than one virtual machine may be tested at the same time. FIG. 1D illustrates an example where VM n and VM m are being tested. In this example, the VPN may be the same for both of the VM n and the VM m. However, each may have their own VPN connection. Further, a dummy virtual machine at the source site 102 is created for each of the virtual machines that have been migrated and that are being tested. In part, this is performed because communications to the VM m cannot be forwarded by the VM n or by the dummy VM n. Each of the dummy virtual machines can act as a replicator between the corresponding migrated virtual machine and the other virtual machines 108 (or clients, servers, etc.).

The order in which this process is performed can vary.

Figure 2:
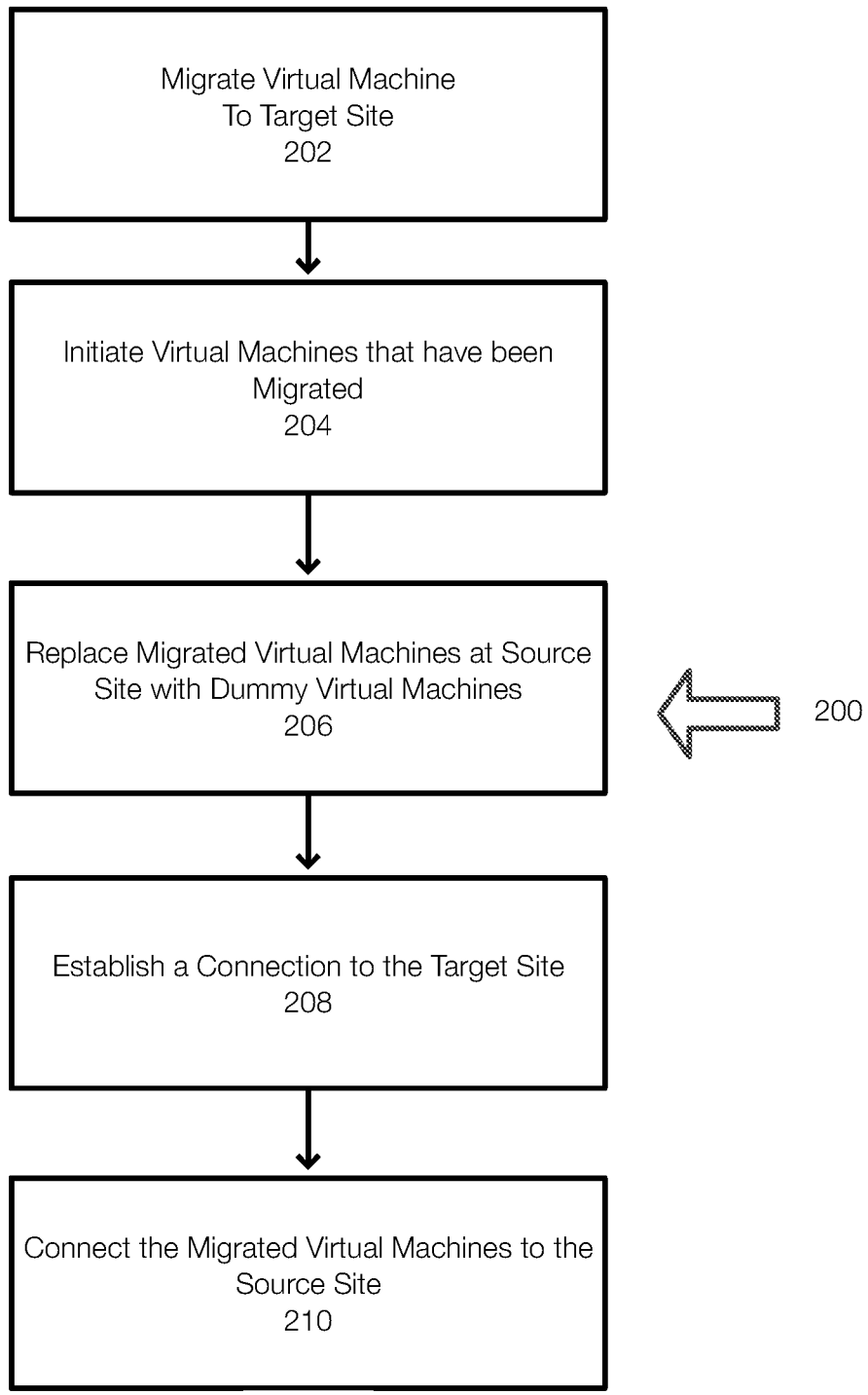
FIG. 2 illustrates an example of a method for testing disaster recovery or failover.

FIG. 2 illustrates an example of a method 200 for performing disaster recovery testing operations, failover or partial failover operations, or disaster recovery. Disaster recovery testing allows, eventually and if desired, all of the virtual machines at the source site to be tested over time. The virtual machines may be tested in batches for example. This prepares the source site for failure of any of the virtual machines. All the virtual machines will have been tested and disaster recovery can be performed based on the results of the disaster recovery testing. For example, the results may include the proper configurations of the virtual machines at the target site, subnet and VPN settings at the target site, and the like. This further allows the disaster or partial disaster recovery to be performed in an automated manner without having to manually configure the virtual machines because they would have been previously tested, and the settings or configurations would be known.

The method 200 may begin by migrating 202 at least one virtual machine from a source site. A subnet may be created at the target site prior to migrating the virtual machines to the target site. In addition, the virtual machines to be migrated will be selected by a user or in an automated fashion. The disaster recovery engine may simply identify and test all virtual machines over time. The virtual machines can be selected in any number (e.g., 1, 2, or more). Further, the selected virtual machines may or may not be associated with the same application.

Prior to migration, a backup of the selected virtual machines may be performed, and this backup may be used to restore the virtual machine at the target site. Once the backup is restored, the virtual machine is initiated 204 or booted at the target site within the subnet. If necessary, adjustments to the migrated virtual machine may be made to account for the computing environment of the target site.

Next, the virtual machines that have been migrated to the target site are shut down and replaced with dummy virtual machines at the source site 206. The dummy virtual machines are configured to act as replicators. The dummy virtual machines typically have the IP addresses, names, and other information associated with the migrated virtual machines. However, the dummy virtual machines are typically configured to pass communications to/from the migrated virtual machines from/to the virtual machines at the source site.

Once the dummy virtual machines are prepared at the source site and the migrated virtual machines are running at the target site, a connection between the dummy virtual machines and the migrated virtual machines (or between the source site and the target site) is established 208. The connections may be from virtual machine to virtual machine, from source site to target site, or the like. The connection may be a VPN connection for privacy reasons. Thus, the migrated virtual machines are connected to the source site.

The ability to set up this system is an example of disaster recovery testing. Once fully connected, other testing may be performed. This way a disaster recovery scenario can be easily tested with seamless integration to the remaining VMs of the application on the source site, and partial failover can be enabled.

Once the system is configured, it is possible to perform end-to-end disaster recovery testing, or a partial failover for the selected virtual machines without any reconfiguration or changes at the source site.

Figure 3:
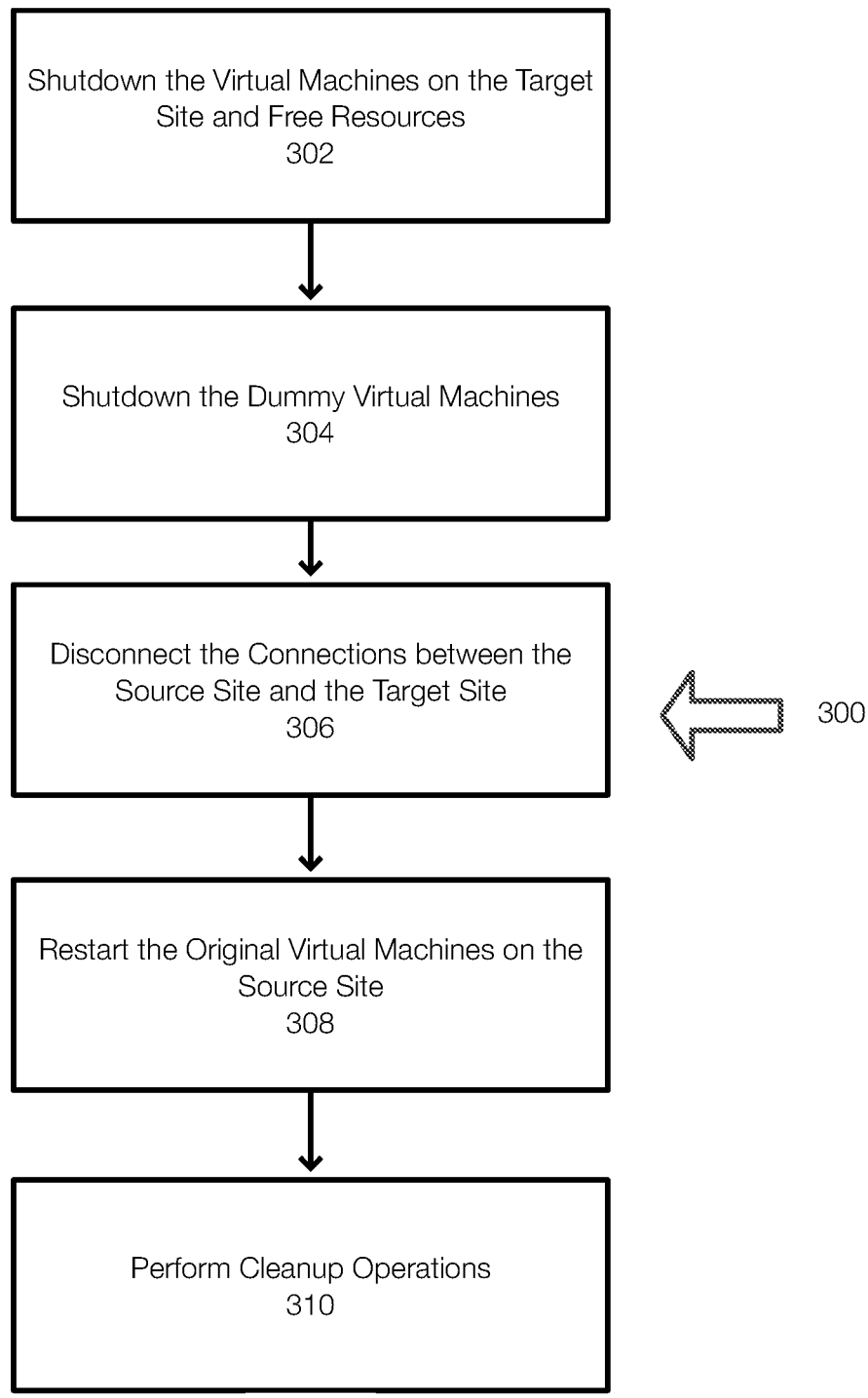
FIG. 3 illustrates an example of a method for reversing a disaster recovery test or failover.

FIG. 3 illustrates an example of a method for terminating or ending disaster recovery testing. In the method 300, the process is reversed to restore the source site to normal operation. In one example, the virtual machines on the target site are shut down and the resources used at the target site are freed 302. In some examples, it may be necessary to replicate any changes back to the source site.

Next, the dummy virtual machines are shutdown 304 and the connections between the target site and the source site are disconnected 306. Next, the original virtual machines are restarted 308 on the source site. The original virtual machines may be restarted from their saved images. The saved images may have been created when the virtual machines were originally migrated and may correspond to the images, copies, or backups that were migrated. Finally, clean up operations are performed 310. This can include things such as deleting the subnet created on the target site or the like, saving migration information, learning from the migration information for subsequent migrations (e.g., to configure virtual machines, set of the subnet), or the like. Thus, machine learning may be incorporated into embodiments of the invention as the migration process is learned.

As previously indicated, all changes and operations that were performed during the disaster recovery test are rolled back at least because the original virtual machines are started from their saved images. In case of a real failover, the changes made on the target site are synched back to the source site if necessary.

Embodiments of the invention provide an automated solution that will simplify disaster recovery of discrete virtual machines from one site to another site at least for disaster recovery testing and for partial failover. This solution will enable organizations to gradually and seamlessly test disaster recovery readiness of multi-VM applications in a quick and a cost-efficient manner and will help enterprises save on disaster recovery costs and reduce the risk of failure when performing disaster recovery to the cloud.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some respects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar and Data Domain platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, containers, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a disaster recovery testing operation, the method comprising:
   migrating a virtual machine at a source site to a subnet at a target site, wherein the source site includes a plurality of virtual machines including the virtual machine, wherein at least some of the plurality of virtual machines that are part of the same application as the virtual machine are not migrated to the target site;
   replacing the virtual machine that has been migrated with a dummy virtual machine at the source site;
   establishing a connection between the virtual machine at the target site and the dummy virtual machine at the source site, wherein the dummy virtual machine is configured to receive and then forward incoming network traffic from the virtual machine at the target site to a recipient virtual machine included in the plurality of virtual machines and to receive and then forward outgoing network traffic from an originating virtual machine included in the plurality of virtual machines at the source site and directed to the virtual machine to the virtual machine at the target site; and
   performing the disaster recovery testing operation on the virtual machine at the target site while the virtual machine at the target site operates in conjunction with the plurality of virtual machines at the source site to determine whether the virtual machine can be recovered at the target site.

2. The method of claim 1, further comprising creating the subnet at the target site before migrating the virtual machine to the subnet.

3. The method of claim 2, further comprising converting the virtual machine that has been migrated to operate in a computing environment of the target site.

4. The method of claim 1, further comprising performing a backup of the virtual machine at the source site and transmitting the backup to the target site.

5. The method of claim 1, further comprising configuring the dummy virtual machine to function as a replicator.

6. The method of claim 1, wherein the connection comprises a virtual private network.

7. The method of claim 1, further comprising migrating multiple virtual machines and replacing each of the multiple virtual machines with a corresponding dummy virtual machine.

8. The method of claim 1, further ending the disaster recovery testing operation by shutting down the virtual machine that has been migrated and the dummy virtual machine and restarting the virtual machine at the source site from the backup.

9. The method of claim 8, further comprising synchronizing the virtual machine that has been restarted with any changes that occurred at the target site.

10. The method of claim 1, further comprising performing an automated disaster recovery or failover operation after the virtual machines are tested.

11. A non-transitory computer readable medium comprising computer executable instructions that, when executed, perform a method for performing a disaster recovery testing operation, the method comprising:
    migrating a virtual machine at a source site to a subnet at a target site, wherein the source site includes a plurality of virtual machines including the virtual machine, wherein at least some of the plurality of virtual machines that are part of the same application as the virtual machine are not migrated to the target site;
    replacing the virtual machine that has been migrated with a dummy virtual machine at the source site;
    establishing a connection between the virtual machine at the target site and the dummy virtual machine at the source site, wherein the dummy virtual machine is configured to receive and then forward incoming network traffic from the virtual machine at the target site to a recipient virtual machine included in the plurality of virtual machines and to receive and then forward outgoing network traffic from an originating virtual machine included in the plurality of virtual machines at the source site and directed to the virtual machine to the virtual machine at the target site; and
    performing the disaster recovery testing operation on the virtual machine at the target site while the virtual machine at the target site operates in conjunction with the plurality of virtual machines at the source site to determine whether the virtual machine can be recovered at the target site.

12. The non-transitory computer readable medium of claim 11, further comprising creating the subnet at the target site before migrating the virtual machine to the subnet.

13. The non-transitory computer readable medium of claim 12, further comprising converting the virtual machine that has been migrated to operate in a computing environment of the target site.

14. The non-transitory computer readable medium of claim 11, further comprising performing a backup of the virtual machine at the source site and transmitting the backup to the target site and configuring the dummy virtual machine to function as a replicator.

15. The non-transitory computer readable medium of claim 14, wherein the dummy virtual machine forwards communications from the source site to the virtual machine at the target site and forwards communications from the virtual machine at the target site to the source site.

16. The non-transitory computer readable medium of claim 11, wherein the connection comprises a virtual private network.

17. The non-transitory computer readable medium of claim 11, further ending the disaster recovery testing operation by shutting down the virtual machine that has been migrated and the dummy virtual machine and restarting the virtual machine at the source site from the backup.

18. The non-transitory computer readable medium of claim 17, further comprising synchronizing the virtual machine that has been restarted with any changes that occurred at the target site.

* * * * *